UNITED STATES PATENT OFFICE.

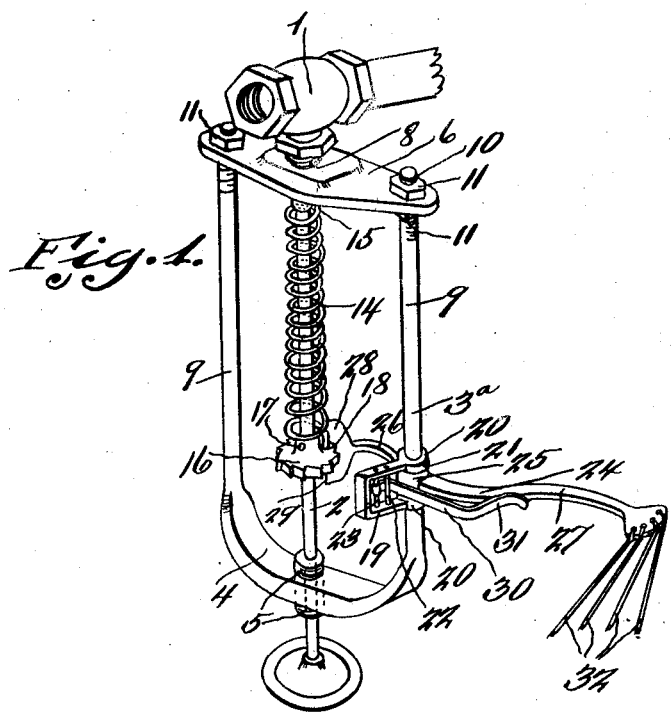

RUBY JOE GRIGSBY, OF HEFLIN, LOUISIANA.

VALVE-CONTROLLING DEVICE.

1,344,633.     Specification of Letters Patent.     Patented June 29, 1920.

Application filed December 5, 1917. Serial No. 205,634.

*To all whom it may concern:*

Be it known that I, RUBY JOE GRIGSBY, a citizen of the United States, residing at Heflin, in the county of Webster, State of Louisiana, have invented a new and useful Valve-Controlling Device; and I do hereby declare the following to be a full, clear, and exact description of the invention, such as will enable others skilled in the art to make and use the same.

This invention relates to an improved device for automatically controlling a screw globe or gate valve, and one of the objects of the invention is to provide a device of this kind, which, should the steam pipe in the engine room near the boiler break, may be actuated by means remote from the boiler, in fact exteriorly of the engine room, whereby the valve may be closed, consequently shutting off the steam, and relieving an attendant from the necessity of entering room which may be filled with live steam.

A further object of the invention is to provide a device of this kind consisting of a normally opened globe or gate valve, a frame carried by the casing of the valve, and spring tensioned lever mounted on one side of the frame to engage a ratchet wheel on the stem of the valve, to hold the valve normally open, in combination with means remote from the boiler for releasing the spring tensioned lever.

In practical fields the details of construction may necessitate alterations falling within the scope of what is claimed.

The invention compries further features and combination of parts as hereinafter set forth shown in the drawings and claimed.

In the drawings:—

Figure 1 is a view in perspective of a conventional form of a globe or gate valve, showing the automatic controlling device applied thereto.

Fig. 2 is an end elevation of the valve showing the controlling device applied and in section, and parts in elevation.

Fig. 3 is a sectional view on line 3—3 of Fig. 2.

Referring more especially to the drawings, 1 designates the casing of an ordinary gate or globe valve, in which the stem 2 of the valve 3 proper is threaded in the usual manner (not shown). A frame which carries the controlling device comprises the U-shaped member 3ª, in the portion 4 of which a bushing 5 is threaded. The stem 2 of the valve is mounted in said bushing. A cross piece 6 is threaded at 7 to the extension 8 of the casing of the valve. The arms 9 of the U-shaped member 3 pass through the end of the cross piece 6 and have their upper ends 10 provided with threads, which are engaged by the nuts 11 and 12, above and below the ends of the cross piece 6. An extension 13 extends axially downwardly from the cross piece 6, and a coil spring 14 surrounds the stem 2 of the valve, and has its upper end surrounding the extension 13, and its extremity connected at 15 to said extension. A ratchet wheel 16 is secured by a pin 17 to the valve stem 2, the lower extremity of the spring 14 is connected at 18 to the ratchet wheel. A U-shaped bracket 19 is provided, and the arms of this bracket have collars 20 integral therewith, and which are secured by pins 21 to one of the arms 9 of the U-shaped member 3ª. The bracket 19 is provided with pins 22 and 23, which are in parallelism. A lever 24 is provided, and which has a transversely disposed collar 25, which is swiveled on one of the arms 9 of the member 3 between the collars 20. This lever 24 comprises the short and long arms 26 and 27. The arm 26 is provided with an elongated blade 28, the edge 29 of which is designed to engage the teeth of the ratchet, thereby preventing the stem of the valve under the tension of the spring 14 from rotating in its thread bearing and closing the valve. A spring 30 is secured to the pin 23, and engages about the pin 22, and has its laterally curved end portion 31 engaging the long arm 27 of the lever 24 and along the blade 28 in engagement with the ratchet. A plurality of wires or cords 32 are connected to the long arm 27. These wires or cords may extend to any suitable locations and any one of the wires may be actuated by any suitable means, or oscillate the lever and disengage the blade from the ratchet, so as to allow the valve to automatically close under the action of the spring 14, whereby the steam may be cut off, in case the steam pipe bursts in the boiler room.

The invention having been set forth what is claimed as new and useful is:—

The combination with a valve casing having a lateral extension and provided with a longitudinally movable valve stem passing through and extending beyond the extension, of a cross piece threaded to the extension and having an opening through which the stem passes to extend beyond and move longitudinally therein, an inverted U-shaped member having the upper ends of its arms adjustably fixed to the ends of the cross piece, the lower arch of the U-shaped member having an adjustable bearing which is removable and forming bearing for the valve stem, a ratchet splined to the valve stem, a coiled spring surrounding the stem and connecting between the ratchet and the cross piece and being under tension when the valve is opened, a detent lever for said ratchet pivoted on one of the arms of the U-shaped member, said lever having one of its arms provided with an elongated ratchet tooth engaging blade whereby as the valve stem moves longitudinally as the valve is opened to various degrees the end of the detent lever will be kept in engagement with the teeth of the ratchet, spring means for normally holding the elongated tooth in engagement with the teeth of the ratchet and means whereby said detent lever may be rocked for releasing the same from engagement with the ratchet and allowing the valve stem to be revolved by the spring and the valve closed.

In testimony whereof I have signed my name to this specification in the presence of two subscribing witnesses.

RUBY JOE GRIGSBY.

Witnesses:
 W. P. STEWART,
 W. M. WATTS.